J. T. LEE AND S. T. HOBBS.
PEANUT DIGGER.
APPLICATION FILED AUG. 28, 1918.
1,302,568.
Patented May 6, 1919.
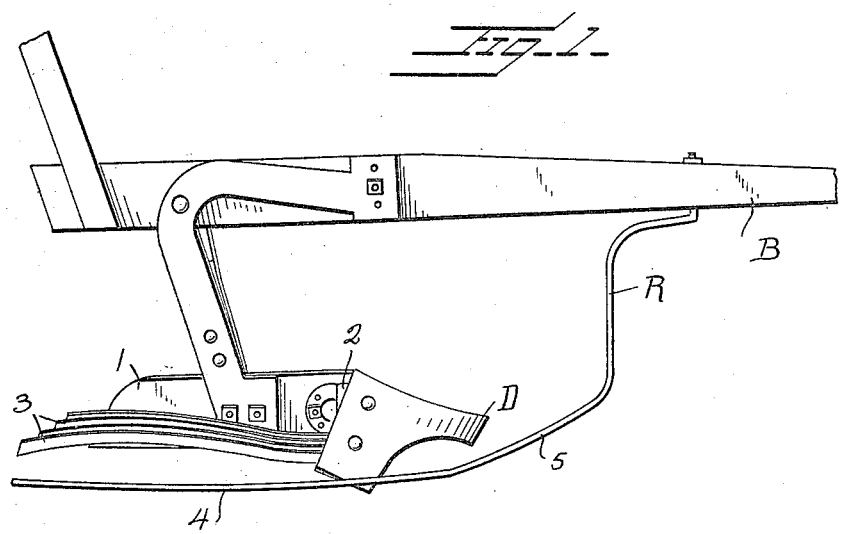
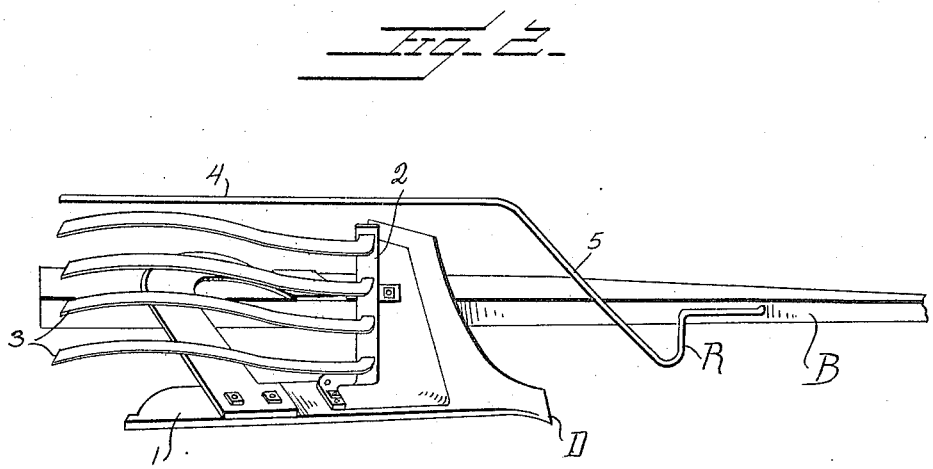
Inventors
J. T. Lee and
S. T. Hobbs
By Watson E. Coleman
Attorney

UNITED STATES PATENT OFFICE.

JAMES T. LEE, OF SALE CITY, AND SAMUEL T. HOBBS, OF CAMILLA, GEORGIA.

PEANUT-DIGGER.

1,302,568.     Specification of Letters Patent.     Patented May 6, 1919.

Application filed August 28, 1918. Serial No. 251,822.

*To all whom it may concern:*

Be it known that we, JAMES T. LEE and SAMUEL T. HOBBS, citizens of the United States, residing at Sale City and Camilla, respectively, in the county of Mitchell and State of Georgia, have invented certain new and useful Improvements in Peanut-Diggers, of which the following is a specification, reference being had to the accompanying drawings.

This invention relates to certain improvements in peanut diggers and it is an object of the invention to provide a novel and improved device of this general character employing a plow or digging element and wherein separating tines extend rearwardly from said element.

It is an object of the invention to provide a device of this general character wherein means are employed for engaging the foliage of the plants for throwing and holding the same to one side of the device so that the digging element will bring the nuts to the top of the loosened material or soil.

The invention consists in the details of construction and in the combination and arrangement of the several parts of our improved peanut digger whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood we will now proceed to describe the same with reference to the accompanying drawings, wherein:

Figure 1 is a view in side elevation of a peanut digger constructed in accordance with an embodiment of our invention, with certain of the parts shown in fragment; and Fig. 2 is a view in bottom plan of the device as herein embodied.

As disclosed in the accompanying drawings B denotes a beam of conventional construction which is provided at its rear portion with the depending stock or standard which is suitably secured to the rear portion of the landside 1. Engaged with the forward end portion of the landside is the digging element or plow D which is arranged entirely to one side of the landside 1.

Connecting the lower and outer portion of the digging element or plow D and the landside 1 adjacent the rear thereof is the transversely disposed cross member 2. Extending rearwardly from the member 2 are the elongated tines 3, of a length to terminate rearwardly of the landside 1. Each of the tines 3 has its central portion arranged on an upward curvature as clearly indicated in the accompanying drawings, whereby the separating function thereof is materially facilitated.

Secured to the beam B in advance of the digging element or plow D is an end portion of a rod R. Said rod R depends from the beam B on a downward and lateral incline and has its lower end continued by a rearwardly directed extension 4 terminating substantially flush with the rear or free ends of the tines 3. The forward portion of the extension 4 is arranged on an upward incline as at 5 and the transverse inclination of said rod is such as to position the extension 4 to one side of the digging element or plow D.

As the device is drawn forward the digging element or plow D operates to loosen or elevate the plants but before being engaged by the digging element or plow the foliage of the plants is forced downwardly into contact with the ground and at one side of the digging element or plow D by the rod R, which action is facilitated by the inclined portion 5. The extension 4 serves to maintain the foliage in such position during the digging operation so that the nuts are elevated or raised to the top so that the desired separation may be effectually accomplished as the nuts and root portions of the plants pass over the tines 3.

From the foregoing description, it is thought to be obvious that a peanut digger constructed in accordance with our invention is particularly well adapted for use by reason of the convenience and facility with which it may be assembled and operated and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:

1. A peanut digger comprising a supporting member, a digging element carried thereby, and a rod secured to the support in advance of the digging element, said rod being inclined downwardly and transversely in advance of and across the path of travel of the digging element and terminating in close proximity to the ground over which the device traverses, said rod also extending alongside the digging element.

2. A peanut digger comprising a supporting member, a digging element carried thereby, and a rod secured to the support in advance of the digging element, said rod being inclined downwardly and transversely in advance of and across the path of travel of the digging element and terminating in close proximity to the ground over which the device traverses, said rod being provided at its lower end with a rearwardly directed extension terminating rearwardly of the digging element.

In testimony whereof we hereunto affix our signatures in the presence of two witnesses.

JAMES T. LEE.
SAMUEL T. HOBBS.

Witnesses:
JONAH PALMER,
ROBERT LEE.

Copies of this patent may be obtained for five cents each, by addressing the "Commissioner of Patents, Washington, D. C."